Jan. 16, 1923.

W. M. BELL.
AUTOMATIC CUT-OFF VALVE MECHANISM FOR WELDING AND CUTTING TORCHES.
FILED MAR. 15, 1922.

Inventor
William M. Bell.
By
W. E. Dunlap
Attorney

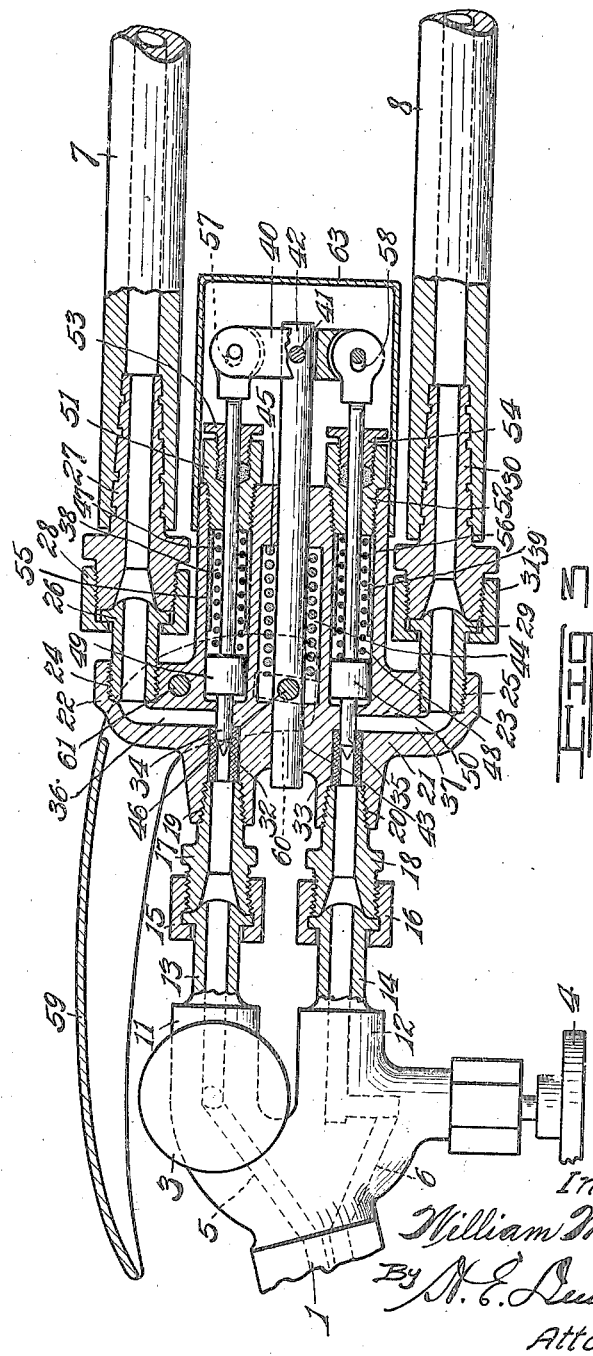

Patented Jan. 16, 1923.

1,442,039

UNITED STATES PATENT OFFICE.

WILLIAM M. BELL, OF PORTSMOUTH, OHIO.

AUTOMATIC CUT-OFF VALVE MECHANISM FOR WELDING AND CUTTING TORCHES.

Application filed March 15, 1922. Serial No. 543,966.

*To all whom it may concern:*

Be it known that I, WILLIAM M. BELL, a citizen of the United States of America, and resident of Portsmouth, county of Scioto, and State of Ohio, have invented certain new and useful Improvements in Automatic Cut-Off Valve Mechanisms for Welding and Cutting Torches, of which the following is a specification.

This invention relates broadly to torches of the type in which mixtures of oxygen and acetylene gases are employed for producing an oxy-acetylene flame for use in the autogenous welding and the cutting of metals, and, more specifically stated, the invention relates to an automatic gas control mechanism for such torches.

The primary object of the invention is to provide a torch of the character referred to embodying mechanism by means of which the passage of gases therethrough is instantly stopped and the flame extinguished when the torch is laid down or set aside following use, thereby eliminating not only the needless waste of gases, but also the risk of property damage and the danger of personal injury which are incident to the laying aside of burning torches.

A further object is to provide a welding or cutting torch embodying valves, auxiliary to the ordinary main control valves common to such torches, which are normally held closed for preventing the passage of the gases therethrough, which are actuated to and held in open position by a conveniently applied pressure of the operator's torch-supporting hand when the torch is in use, and which are automatically and instantly closed when the hand pressure is released, as when the torch is laid down.

A still further object is to provide a control mechanism of the character referred to which constitutes an attachment that is readily applicable as a unit to any standard commercial form of welding or cutting torch without requiring that any change or modification be made in the structure of such torch.

With these and other objects in view, the invention resides in the features of construction, arrangement of parts and combinations of elements which will hereinafter be fully described, reference being had to the accompanying drawings, in which—

Figure 3 is an enlarged central vertical section of the invention illustrating its application.

Figure 1:
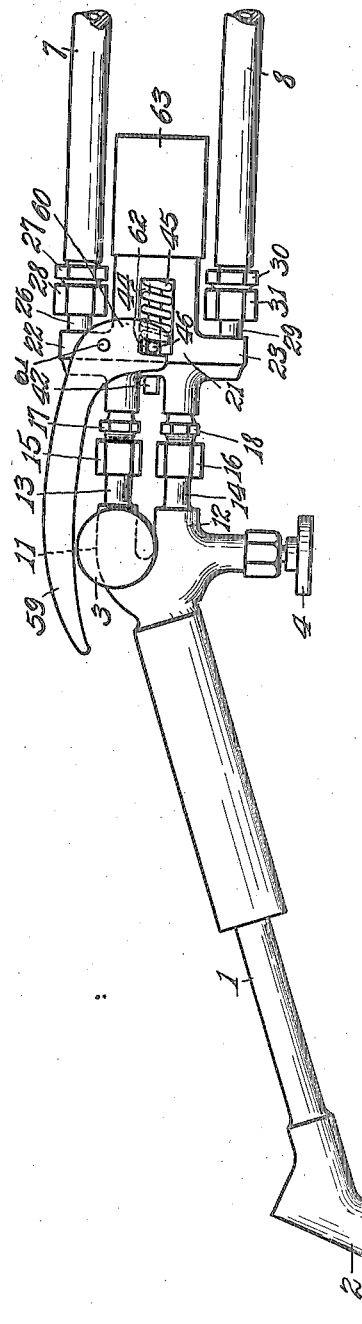
Figure 1 is a side elevation of a torch embodying my invention.
Figure 2:
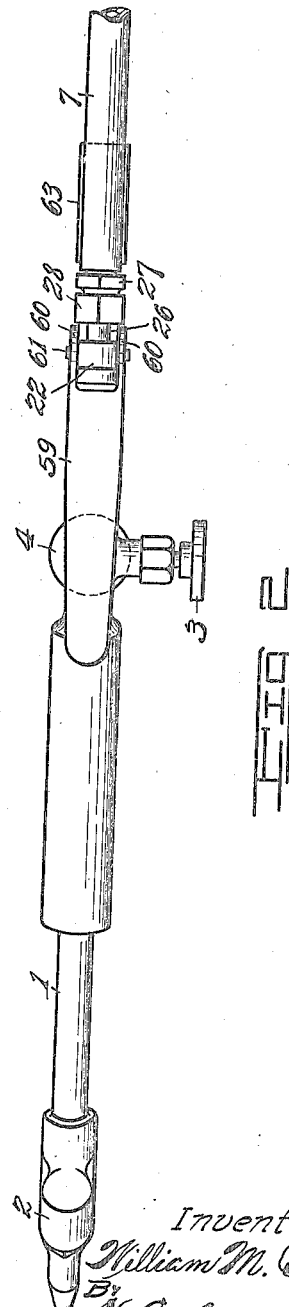
Figure 2 is an upper edge view of the same; and—

Referring to said drawings, 1 indicates the stem and 2 the head of a torch of a more or less common commercial type, the same having the usual control valves 3 and 4 whereby the passage of the oxygen and acetylene gases through the passages 5 and 6, respectively, to the head 2 is controlled and whereby the proportions of the said gases composing the burning mixture are regulated.

As hitherto employed the flexible tubings 7 and 8 through which the oxygen gas and the acetylene gas were supplied have been attached to nipples threaded into the outer ends of the arms or branches 11 and 12 at the rear end of the stem 1. In the present invention, said arms have mounted therein the front ends of nipples 13 and 14 to the rear ends of which are coupled, as by threaded unions 15 and 16, the front ends of nipples 17 and 18 which have their rear ends threaded into sockets 19 and 20 provided therefor in a valve body 21.

The body 21 has two outwardly and oppositely directed arm-like portions 22 and 23, the former being preferably extended upward and the latter downward, as shown, and said arms 22 and 23 have therein rearwardly-opening threaded sockets 24 and 25 for the reception of the front ends of hose couplings. As herein shown, the coupling for the hose 7 consists of two longitudinally alined nipples 26 and 27 coupled by means of a sleeve nut or union 28, while that for the hose 8 is substantially identical, consisting of alined nipples 29 and 30 joined by a nut or union 31.

Disposed in the body 21 rearward of and in alinement with the sockets 19 and 20 are suitable bushings 32 and 33 in which are formed seats for needle valves 34 and 35 whereby, as will hereinafter be explained, the passage of the gases is controlled. Leading off from the rear ends of the gas passages of the bushings 32 and 33 and extending outward through the arms 22 and 23 are passages 36 and 37 which communicate at their outer ends with the couplings received in the sockets 24 and 25. Thus, as is apparent, the needle valves 34 and 35, when in their advanced positions, effectually close off the passage of the gases to the passages 5 and 6 of the torch body or stem 1, and when in their retracted positions permit unobstructed flow of said gases.

Said needle valves 34 and 35 have the stems thereof extending rearward through parallel bores 38 and 39 provided in said valve body 21 and have their rear ends pivotally attached to the opposite ends of a crosshead 40 which is pivoted intermediate its ends upon a pin 41 carried by the rear end portion of a rod 42. Said rod is extended through and is longitudinally movable in a bore 43 provided therefor in said valve body between and parallel to the bores 38 and 39. A chamber or side-opening slot 44 is provided by enlargement of an intermediate portion of the bore 43, and disposed within said slot in encircling relation to said rod 42 is a spiral compression spring 45 designed to normally maintain said rod and, consequently, the crosshead and the attached valves 34 and 35 in an advanced position in which said valves are seated for closing the gas passages. Said spring has its front end resting against a cross pin 46 carried by the rod 42 in a suitable position and has its rear end seated against the shoulder formed at the outer end of the slot 44, as shown.

The bores 38 and 39, except at their forward ends, are made of materially larger diameter than the stems of the valves 34 and 35 and have compression springs 47 and 48 disposed therein in encircling relation to said stems, the front ends of said springs resting against guide-collars 49 and 50 carried by said stems and the rear ends thereof being seated against the inner ends of stuffing boxes 51 and 52 which are threaded in the outer ends of said bores and which preferably have packing glands 53 and 54 fitted in the outer ends thereof in embracing relation to said stems. Said bores 38 and 39 preferably have bushings 55 and 56 fitted therein, the same being of a length which permits of the requisite rearward movement of the collars 49 and 50 for effecting opening of the gas passages. Said springs 47 and 48 are not only auxiliary to the main valve-closing spring 45, but serve to compensate for any slight wear which may occur either in the valves 34 and 35 or their seats, a slight independent movement of said valves being permitted by the provision of elongated openings or slots 57 and 58 in said stems at the points of their pivotal connection with the crosshead.

A lever 59 has a bifurcated head disposed in straddling relation to the upper front end of the valve body 21 and with the parallel members 60 of said head mounted upon a pivot-pin 61 which is directed through said body. Each of said head members 60 has therein a substantially vertical slot 62, and received in said slots are the opposite ends of the cross-pin 46. The body of said lever, which is preferably made of sheet-like material shaped in concavo-convex form, extends forwardly in overhanging relation to the upper branch 11 of the stem 1 and normally occupies a position parallel to and at a suitably spaced distance from said branch.

It is designed that the portion of the torch located directly rearward of the main valves 3 and 4, or between said valves and the valve body 21, shall be grasped by the operator for supporting the torch. Thus supported or grasped, the body of the lever 59 is properly located to be depressed toward the underlying parts of the structure by a slight applied gripping pressure of the hand. Such depression of the lever causes the head of the latter to swing on the pivot-pin 61 and, through the cross-pin 46 which is engaged therewith, thrusts the rod 42 rearward against the tension of its spring 45. This action, through the intermediate crosshead 40, retracts the valves 34 and 35 from their advanced seated positions for allowing unobstructed passage of the gases past said valves. When the lever-depressing hand pressure is released, as when the torch is laid down, the flow of the gases is instantly cut off by the automatic closing of said valves. When, on the other hand, the torch is again taken up for use, the lever is depressed to valve opening position and the gases may be relighted by swinging the burner tip into proximity to a suitably located pilot flame.

It will be obvious that the main valves 3 and 4 need be employed only for adjustment to regulate the proportions in which the gases are supplied to the torch head or burner tip, and that, when once adjusted, it will rarely become necessary to alter or otherwise disturb such adjustment.

To guard against chance injury to the mechanism, it is preferred that a suitable casing, as the rectangular casing 63, be slipped to a closely seated position upon the rear end of the valve body 21 for enclosing and shielding the crosshead 40 and the adjacent parts of the structure.

From the foregoing it will be understood that the invention provides means whereby, when the torch is laid down or aside following use, the flow of gas therethrough is automatically and instantly cut off and the flame extinguished. Thus, as is manifest, is eliminated the very great waste of gases which would otherwise be incident to failures on the part of the operator to extinguish the torch when the latter is laid down for short intervals of time, which practice is very generally followed and ordinarily occurs quite frequently in the course of a day's time. Further, the dangers of property damage and of injury to workmen through the careless handling of lighted torches is very largely avoided through the use of the invention.

It will finally be noted that the invention is in the form of an attachment which is equally applicable to specially constructed new torches and to torches which are already in use.

While the invention has herein been described as applied to an oxy-acetylene welding or cutting torch, it will be understood that it is equally applicable to torches employing other gases or liquids.

What is claimed is—

1. In a device of the character described, the combination with a torch body having separate gas passages, of a valve mechanism comprising a valve body provided with gas passages therein, valves controlling said passages, a member connecting said valves, a rod attached to said member, resilient means associated with said rod and acting through said member for normally holding said valves closed, auxiliary resilient means associated with each of said valves tending to hold the latter closed, and a lever whereby said rod may be actuated for shifting said valves to open positions against the various resilient means, said lever being located in a position to be actuated by pressure applied by the hand which supports the torch.

2. In a device of the character described, the combination with a torch body having separate gas passages, and flexible gas-conducting tubes, of a valve mechanism interposed between said tubes and said body, said mechanism including valves controlling communication between said tubes and said passages, a rod located between and parallel to said valves and yoked to the latter, a spring normally maintaining said rod in an advanced position holding said valve seated, and means actuated by hand pressure for thrusting said rod to retracted position against the tension of said spring for actuating said valves to open positions.

3. The combination of a blow torch and means for supplying gases thereto, said means comprising a member having gas passages, longitudinally shiftable valves for controlling said passages, a crosshead pivotally connected at opposite ends to said valves, a single resilient member associated with and acting through said crosshead whereby both of said valves are normally held closed, and means adapted to be actuated by hand pressure to shift said crosshead for retracting said valves from seated position.

4. In a device of the character described, the combination with a torch body having separate gas passages, and flexible gas-conducting tubes, of a valve mechanism interposed between said tubes and said body, said mechanism including valves controlling communication between said tubes and said passages, a crosshead connecting said valves, a longitudinally movable rod located between and parallel to said valves, a spring normally maintaining said rod in an advanced position in which said vaves are seated, and a pivoted lever whereby said rod may be shifted against the tension of said spring for opening said valves.

5. In a device of the character described, the combination with a torch body having separate gas passages, and flexible gas-conducting tubes, of a valve mechanism interposed between said tubes and said body, said mechanism including valves controlling communication between said tubes and said passages, a crosshead connecting said valves, a longitudinally movable rod located between and parallel to said valves, a spring normally maintaining said rod in an advanced position in which said valves are seated, and a pivoted lever whereby said rod may be shifted against the tension of said spring for opening said valves, said lever being located in a position to be actuated to valve-opening position by pressure applied by the hand which supports the torch.

6. The combination of a blow torch and means for supplying gas thereto, said means comprising a member having gas passages, valves for controlling said passages, a crosshead pivotally connected at its opposite ends to said valves, resilient means associated with and acting through said crosshead whereby said valves are normally held closed, auxiliary resilient means associated with each of said valves and normally tending to hold the latter closed, means permitting a slight movement of said valves independent of said crosshead, and means adapted to be actuated by hand pressure for opening said valves.

In testimony whereof, I affix my signature in presence of two subscribing witnesses.

WILLIAM M. BELL.

Witnesses:
CLARENCE T. DUGAN,
K. P. FUHRMANN.